United States Patent
Rohmer et al.

(10) Patent No.: US 10,576,629 B2
(45) Date of Patent: Mar. 3, 2020

(54) CONTROLLING A COMPLIANT-CONTROLLED ROBOT

(71) Applicant: KUKA Deutschland GmbH, Augsburg (DE)

(72) Inventors: Matthias Rohmer, Augsburg (DE); Tobias Reichl, Munich (DE); Gunter Schreiber, Friedberg (DE); Holger Monnich, Friedberg (DE); Martin Mueller-Sommer, Aindling (DE); Uwe Bonin, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 94 days.

(21) Appl. No.: 15/208,668

(22) Filed: Jul. 13, 2016

(65) Prior Publication Data
US 2017/0014997 A1    Jan. 19, 2017

(30) Foreign Application Priority Data
Jul. 13, 2015   (DE) ........................ 10 2015 009 048

(51) Int. Cl.
*G06F 19/00* (2018.01)
*B25J 9/16* (2006.01)
*G05B 19/423* (2006.01)

(52) U.S. Cl.
CPC .......... *B25J 9/1633* (2013.01); *B25J 9/1676* (2013.01); *G05B 19/423* (2013.01); *G05B 2219/39342* (2013.01); *G05B 2219/40359* (2013.01)

(58) Field of Classification Search
CPC ..... B25J 9/1633; B25J 9/1676; G05B 19/423; G05B 19/39342; G05B 2219/40359
(Continued)

(56) References Cited

U.S. PATENT DOCUMENTS

| 4,674,678 A | 6/1987 | Knebel et al. |
| 6,131,097 A | 10/2000 | Peurach et al. |

(Continued)

FOREIGN PATENT DOCUMENTS

| CN | 203585433 U | 5/2014 |
| DE | 69735708 T2 | 9/2006 |

(Continued)

OTHER PUBLICATIONS

European Patent Office; Search Report in European Patent Application No. 116001270.4 dated Dec. 21, 2016; 10 pages.
(Continued)

*Primary Examiner* — Ronnie M Mancho
(74) *Attorney, Agent, or Firm* — Dorton & Willis, LLP

(57) ABSTRACT

In one aspect, a method for controlling a compliant-controlled robot includes performing a boundary monitoring of the robot and controlling movement of the robot with a return force that is predetermined by control technology. If the robot is already in a blocked area upon activation of the boundary monitoring, then a first return force operates to return the robot from a current position in the blocked area toward a boundary of the blocked area. If the robot arrived at the current position in the blocked area after activation of the boundary monitoring, then a second return force operates to return the robot from the current position toward the boundary. The first return force is at least temporarily less than the second return force.

25 Claims, 2 Drawing Sheets

(58) Field of Classification Search
USPC .......................................................... 700/245
See application file for complete search history.

(56) References Cited

U.S. PATENT DOCUMENTS

| | | | | |
|---|---|---|---|---|
| 7,035,716 | B2* | 4/2006 | Harris | B25J 9/1689 318/568.1 |
| 8,388,605 | B2 | 3/2013 | Umemoto et al. | |
| 8,442,686 | B2* | 5/2013 | Saito | B25J 9/06 700/245 |
| 8,958,915 | B2* | 2/2015 | Takagi | B25J 9/1075 700/261 |
| 9,044,860 | B2* | 6/2015 | Takagi | B25J 9/1633 |
| 9,050,721 | B2* | 6/2015 | Inazumi | B25J 9/1633 |
| 9,050,724 | B2* | 6/2015 | Takagi | B25J 9/1633 |
| 9,221,172 | B2* | 12/2015 | Williamson | B25J 9/1643 |
| 9,250,624 | B2* | 2/2016 | Zimmermann | G05B 19/423 |
| 9,283,678 | B2* | 3/2016 | Kuffner, Jr. | B25J 9/1676 |
| 9,308,646 | B2* | 4/2016 | Lim | B25J 9/1633 |
| 9,339,934 | B2* | 5/2016 | Kogan | B25J 9/1656 |
| 9,346,161 | B2* | 5/2016 | Kose | B25J 9/1633 |
| 9,403,274 | B2* | 8/2016 | Sasai | B25J 9/1674 |
| 9,403,276 | B2* | 8/2016 | Nishimura | B25J 9/1676 |
| 9,427,870 | B2* | 8/2016 | Takagi | B25J 9/1633 |
| 9,452,531 | B2* | 9/2016 | Kikkeri | B25J 9/1676 |
| 9,452,532 | B2* | 9/2016 | Komatsu | B25J 9/1676 |
| 9,463,573 | B2* | 10/2016 | Inazumi | B25J 9/1612 |
| 9,550,295 | B2* | 1/2017 | Shiratsuchi | B25J 9/1666 |
| 9,579,793 | B2* | 2/2017 | Jacob | B25J 9/1676 |
| 9,775,681 | B2* | 10/2017 | Quaid | A61B 34/30 |
| 9,804,576 | B2* | 10/2017 | Scott | B25J 9/1676 |
| 2004/0128026 | A1* | 7/2004 | Harris | B25J 9/1689 700/245 |
| 2006/0142657 | A1 | 6/2006 | Quaid et al. | |
| 2007/0296366 | A1 | 12/2007 | Quaid et al. | |
| 2009/0076330 | A1 | 3/2009 | Ashida | |
| 2012/0158011 | A1 | 6/2012 | Sandhu et al. | |

FOREIGN PATENT DOCUMENTS

| | | |
|---|---|---|
| DE | 102005054575 B3 | 4/2007 |
| DE | 102010037227 A1 | 3/2012 |
| DE | 102012002941 A1 | 4/2014 |

OTHER PUBLICATIONS

Ho et al; Publication Entitled "Robot Assisted Knee Surgery" dated May 1995; 10 pages.

German Patent Office; Examination Report in German Patent Application No. 10 2015 009 048.8 dated Feb. 11, 2016; 5 pages.

Chinese Patent Office; Office Action in related Chinese Patent Application No. 201610548401 dated May 30, 2018; 10 pages.

Chinese Patent Office; Second Office Action in related Chinese Patent Application No. 201610548401.X dated Jan. 3, 2019; 6 pages.

* cited by examiner

CONTROLLING A COMPLIANT-CONTROLLED ROBOT

CROSS-REFERENCE TO RELATED APPLICATIONS

This application claims the benefit of priority under 35 U.S.C. § 119(a) to German Patent Application DE 10 2015 009 048.8, filed Jul. 13, 2015 (pending), the disclosure of which is hereby incorporated by reference in its entirety.

TECHNICAL FIELD

The present invention relates to a method and a control for controlling a compliant-controlled robot as well as a computer programming product for executing the method and a robot arrangement comprising said control.

BACKGROUND

A method for controlling a compliant-controlled robot is known from US 2004/0128026 A1, in which in a first free area an admittance of the robot, by which it follows an actuating force of a surgeon, is high and a stiffness and damping is low, by which the robot is fixed to its present position by way of control technology.

In a third, blocked area the stiffness and damping is very high, by which the robot is fixed using control technology at a position which is next to its present position at the boundary of the blocked area, in order to return the robot out of the blocked area.

In a second area between the first and the third area the admittance is reduced and the stiffness and damping are increased by which the robot is tied to its present position using control technology.

If such a boundary monitoring is activated when the robot is already far away from the boundary inside the blocked area, immediately a massive return motion of the robot develops, which may lead to an unexpected and/or undesired behavior.

The objective of the present invention is to improve the operation of a compliant-controlled robot.

SUMMARY

According to one aspect of the present invention a method for controlling a compliant-controlled robot comprises the step: Performing a boundary monitoring of the robot, with a first return force being predetermined and/or commanded, which returns or attempts to return the robot from a present position in a blocked area to a boundary of said area, in particular applied thereupon, conditionally and/or depending on the question if the robot, at the time the boundary monitoring is activated, is already located at a position inside the blocked area, and a second return force, which returns or attempts to return the robot from the (same) position towards the boundary, is predetermined by control technology and/or commanded, in particular applied thereupon, conditional to and/or depending on the question if the robot assumes and/or shows said position in the blocked area only after activation of the boundary monitoring, with the first return force always or at least temporarily, at least upon activation of the boundary monitoring, being lower than the second return force, in particular always or at least temporarily, in particular at least upon activation of the boundary monitoring being zero and/or always or at least temporarily, in particular upon activation of the boundary monitoring amounting maximally to 75%, in particular maximally 50%, in particular maximally 25% in reference to the second return force.

A control according to one aspect of the present invention is to perform a method described here, in particular by technical hardware and/or software, with means being implemented and/or included for executing boundary monitoring of a robot, means for technically predetermining and/or commanding, in particular applying a first return force, which returns or attempts to return the robot from a present position in a blocked area to a boundary of said area, conditional to and/or depending on the question if the robot upon activation of the boundary monitoring is already located in said position in the blocked area, and means for the technical predetermination and/or commanding, in particular applying of a second return force, which returns or attempts to return the robot from the (same) position to the boundary, conditional to and/or depending on the question if the robot only assumes and/or shows this position in the blocked area after activation of the boundary monitoring, with the first return force always or at least temporarily, in particular at least upon activation of the boundary monitoring, being lower than the second return force, in particular always or at least temporarily, in particular upon activation of the boundary monitoring being equivalent to zero and/or always or at least temporarily, at least upon activation of the boundary monitoring, amounting to maximally 75%, in particular maximally to 50%, in particular maximally 25% of the second return force.

This way, advantageously an unexpected and/or undesired massive return motion of the robot from the blocked area to its boundary, induced by control technology, can be prevented or at least reduced upon activation of the boundary monitoring.

Accordingly, in one embodiment it is determined and/or distinguished if a present position of the robot in the blocked area is already given upon activation of the boundary monitoring or is only assumed or developed after the activation of the boundary monitoring, and based thereon alternatively the first or the second return force is predetermined and/or commanded, in particular applied by control technology. Accordingly, in one embodiment the control comprises means for determining and/or differentiating if a present position of the robot in the blocked area is already given upon activation of the boundary monitoring or only assumed and/or developed after the activation of the boundary monitoring.

In one embodiment a stiffness of a virtual spring is predetermined, which ties the robot by way of control technology at an anchor position, in particular at the boundary, with a first stiffness being predetermined, in particular realized if the robot is already located (in a or the position) in the blocked area upon activation of the boundary monitoring, and a second stiffness being predetermined, in particular realized, if the robot assumes and/or shows the same position in the blocked area or penetrates into it only after activation of the boundary monitoring, with the first stiffness always or at least upon activation of the boundary monitoring being lower than the second stiffness, in particular amounting to zero or maximally 75%, in particular maximally 50%, in particular maximally 25% of the second stiffness.

Accordingly, the control comprises in one embodiment means for predetermining a stiffness of a virtual spring, which ties the robot by way of control technology to an anchor position, particular at the boundary, whereby in one embodiment this means comprising for predetermining a first stiffness, if the robot upon activation of the boundary monitoring being (in one or the position) in the blocked area and showing means for predetermining a second stiffness, if the robot assumes and/or shows and or penetrates into the blocked area only after the activation of the boundary monitoring, with the first stiffness always or at least upon activation of the boundary monitoring being lower than the second stiffness, in particular amounting to zero or maximally 75%, in particular maximally 50%, in particular maximally 25% in reference to the second stiffness.

Additionally or alternatively, in one embodiment the stiffness of a or the virtual spring, which ties the robot by control technology at and/or in the anchor position, in particular at the boundary, depending on a temporal distance from the activation of the boundary monitoring, is realized, in particular also or only if the robot is positioned in the blocked area already upon activation of the boundary monitoring. In one embodiment the stiffness increases with the time passed since the activation of the boundary monitoring, in particular continuously, in particular linearly, or in a discontinuous fashion and/or in one or more discrete steps. The stiffness increases in one embodiment over time from zero and/or to a maximum.

Accordingly, in one embodiment the means for predetermining a stiffness of a virtual spring includes means for predetermining the stiffness depending on a time lag from the activation of the boundary monitoring, in particular also or only if the robot is already in the blocked area upon activation of the boundary monitoring.

Additionally or alternatively, in one embodiment the stiffness of a or the virtual spring, which ties the robot by control technology to one or the anchor position, in particular at the boundary, depending on a motion of the robot in reference to the boundary, in particular realized, in particular (such that) in a motion away from the boundary, in particular constantly or at least temporarily, in particular at least upon activation of the boundary monitoring is greater than during a motion not away from the boundary, in particular a movement towards the boundary or parallel thereto, in particular also or only if the robot is already located in the blocked area upon activation of the boundary monitoring. In one embodiment the stiffness is and/or amounts during a motion not away from the boundary, in particular a motion towards the boundary or parallel thereto, in particular constantly or at least temporarily, in particular at least upon the activation of the boundary monitoring to maximally 75%, in particular maximally 50%, in particular maximally 25% of the stiffness of a motion away from the boundary.

Accordingly, in one embodiment the means for predetermining a stiffness of a virtual spring comprises means for predetermining the stiffness depending on a motion of the robot in reference to the boundary, in particular (such that it) in a motion away from the boundary, in particular constantly or at least temporarily, in particular at least upon activation of a boundary monitoring, is greater than in a motion not away from the boundary, in particular a motion towards the boundary or parallel to the boundary, in particular also or only if the robot is already in the blocked area upon activation of the boundary monitoring.

By such a stiffness of a virtual spring, realized by control technology, depending on direction, time, and/or position of the robot upon activation of the boundary monitoring, advantageously the first and/or the second return force can be predetermined and/or commanded, in particular applied.

According to another aspect of the present invention which may be independently implemented or implemented in combination with the above-stated aspect, a method for controlling a or the compliant-controlled robot comprises the step: Executing a or the boundary monitoring of a robot, with a or the first return force being predetermined or commanded by control technology, in particular applied, which returns or attempts to return the robot from a or the present position in a or the blocked area to a or the boundary of said area, depending on a distance of said position from the boundary, in particular being zero, if the robot is moved by a distance from the boundary towards or parallel to said boundary, and another return force, in particular the first one, which is greater than the first return force, amounting in particular to at least 125%, in particular at least 150%, in particular at least 200% of the first return force, being in particular predetermined and/or commanded by control technology, in particular applied, if the robot is moved away from the boundary by the same distance, in particular also or only if the robot upon activation of the boundary monitoring is already in (this position in) the blocked area, in particular always or at least temporarily, in particular at least upon activation of the boundary monitoring.

The control comprises according to one embodiment means for executing a or the boundary monitoring of the robot, means for predetermining and/or commanding, in particular applying one or a first return force via control technology, which force returns or attempts to return the robot from a or the present position into a or the blocked area to a or the boundary of said area, independent from the distance of the position from said boundary, in particular equal to zero, if the robot is moved by a distance towards the boundary or parallel to said boundary and means for predetermining and/or commanding, in particular applying by way of control technology another, in particular first, return force, which is greater than the first return force, in particular amounting to at least 125%, in particular at least 150%, in particular at least 200% of the first return force, if the robot is moved by the same distance away from the boundary, in particular also or only if the robot is already in (this position in) the blocked area upon activation of the boundary monitoring, in particular always or at least temporarily, in particular at least upon activation of the boundary monitoring.

In other words, according to this aspect a, in particular manually-guided, motion of the compliant-controlled robot towards the boundary or parallel to the boundary by control technology shows a lower resistance, in particular no resistance, contrary to a motion (farther) away from the boundary into the blocked area. This way, in a in particular advantageous fashion upon activation of the boundary monitoring, a relatively low, in particular minute return force towards the boundary is applied and this way an unexpected and/or undesired massive return motion of the robot, induced by control technology, out of the blocked area to its boundary during and/or upon activation of the boundary monitoring is prevented or at least reduced, and simultaneously an undesired additional motion into the blocked area is effectively prevented or at least impeded.

In one embodiment, for this purpose an anchor position of a or the virtual spring, to which the robot is tied by way of control technology, cannot be displaced away from the boundary by an external force impinged thereon, in particular by a manual operation of the robot, at least essentially. Additionally or alternatively, in one embodiment of an or the anchor position of a or the virtual spring which ties the robot by control technology, a or the present position of the robot or a position inside a connection, in particular the shortest one, between the present position and the boundary is predetermined, which is distanced from the present position to the boundary by a distance, in particular a fixed predetermined or variably predetermined one.

Accordingly, in one embodiment the control comprises means for predetermining a or the present position of the robot or a position inside a, in particular shortest, connection between the present position and the boundary, which is distanced by a, in particular fixed predetermined or variably predeterminable, distance from the present position to the boundary, as an or the anchor position of a or the virtual spring which ties the robot by way of control technology.

In other words, in this embodiment an anchor position is set to a present position or to a position distanced by a distance therefrom towards the boundary and/or entrained with the present position, if the present position is not moved away from the boundary, in particular if the present position is moved towards the boundary or parallel to the boundary, and the previous anchor position is maintained, if the robot is moved away from the boundary.

The distance is in one embodiment shorter than the (shortest) distance of the present position from the boundary.

In one embodiment a damping force, which counteracts a motion of the robot and depends on a present speed of said robot, is predetermined or commanded by control technology, in particular applied such that in a second speed range above the predetermined minimum speed it increases more strongly with the present speed of the robot than in a first speed range below the minimum speed.

A means in the sense of the present invention may be embodied by way of technical hardware and/or software means, in particular a processing, in particular micro-processing unit (CPU), preferably connected via a storage and/or bus system transmitting data and/or signals, in particular digital ones, and/or show one or more programs or program modules. The CPU may be embodied such that commands are implemented to process a program saved in a storage system, record input signals from a data bus and/or issue output signals to a data bus. A storage system may comprise one or more, in particular different storage media, in particular optical, magnetic, solid matter, and/or other non-volatile media. The program may be embodied such that it represents and/or can implement the methods described here such that the CPU can execute the steps of such methods and thus can in particular control the robot.

In one embodiment the compliant-controlled robot is impedance- or admittance-controlled, in particular controlled in a manner compensated for gravitation and/or friction, for example as described at the outset in US 2004/0128026 A1, which is hereby included by reference in its entirety. In particular, a compliant-controlled robot is to be understood as a robot, with its control detecting an external force upon the robot, in particular applied by manual guidance and/or manually, and commands and/or executes a motion (of the robot) depending on said force, in particular depending on the strength and/or direction of the force and/or technical hardware and/or software being implemented for that purpose.

The external force may in particular be detected based on forces in the joints and/or drives of the robot or via a force sensor at a handle of the robot.

The blocked area and/or its boundary may in particular be defined and/or predetermined in the joint coordinate space of the robot, in particular in the form of axial stops and/or limits set by control technology. Similarly, the blocked area and/or its boundary can be predetermined in particular in the Cartesian and/or work area of the robot, in particular in the form of limitations and/or stops of its TCP or another robot-fixed reference. Accordingly, a (present) position or speed of the robot, in particular in the work or joint coordinate range of the robot, may be defined and thus in particular the position or speed of the TCP or another robot-fixed reference or one or more axes of the robot may be stated.

For a more compact illustration, in the present case also a non-parallel pair of forces and/or a torque is called a force, in general.

Here, boundary monitoring is understood in particular as monitoring if a present position of the robot is or is not located inside the blocked area.

In one embodiment one or more, in particular all steps of the method are performed in a partially or completely automated fashion, in particular by the control.

BRIEF DESCRIPTION OF THE DRAWINGS

Additional advantages and features are found in the dependent claims and the exemplary implementations, wherein, in partially schematic views:

DETAILED DESCRIPTION

Figure 3:
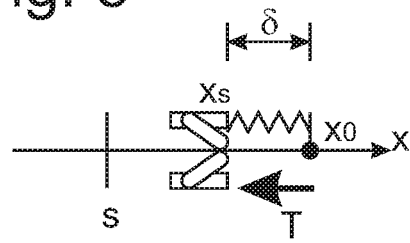
FIG. 3: shows an application of a return force in a blocked area according to another embodiment of the present invention.
Figure 4:
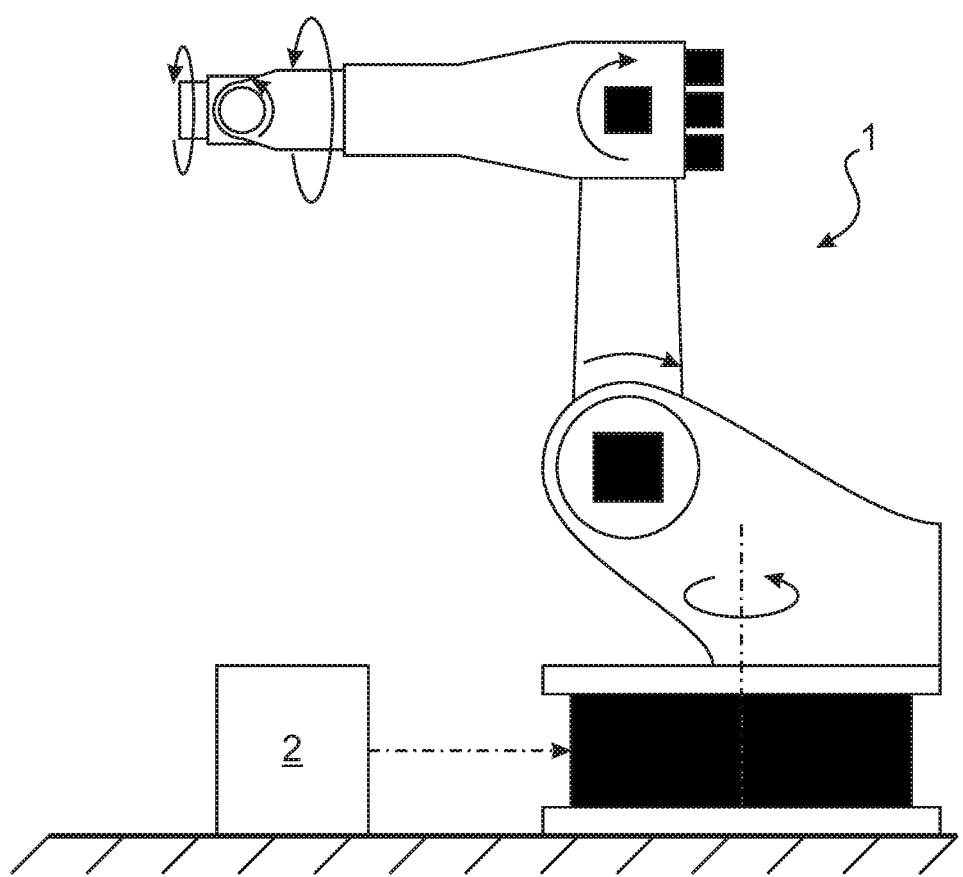
FIG. 4: shows a robot arrangement with the robot and a control according to the present invention.

FIG. 4 shows a robot arrangement with a control 2 and a multi-axis robot 1 flexibly controlled thereby according to one embodiment of the present invention. The control 2 shows in the following with reference to FIG. 1-3 a method explained for controlling the robot 1 and/or is implemented therefore by hardware and/or software.

In a first step S10 the control 2 determines if a boundary monitoring of the robot has been activated. If this is not the case (S10: "N"), step S10 is repeated.

If the control 2 determines that the boundary monitoring of the robot has been activated (S10: "Y"), in step S20 a timer t is initialized and in step S30 it is checked if a present position $x_0$ of the robot 1 is already in a blocked area S upon activation of the boundary monitoring.

Figure 2:
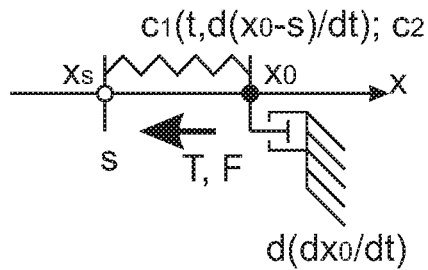
FIG. 2: shows an application of a return force in a blocked area according to one embodiment of the present invention.

The position x may represent a one- or multi-dimensional position and for example describe the position of one or more axes of the robot 1 or the position and orientation and/or the position of its TCP in the work space. In FIGS. 2, 3 it is shown in one dimension for better clarity, with s representing the boundary and x>s the blocked area S.

If the control 2 detects in step S30 that the present position $x_0$ of the robot 1 already upon activation of the boundary monitoring is located in the area S (S30: "Y"), it continues with step S40, otherwise it skips it and continues with step S50.

In step S40 the control 2 specifies a first return force $T_1$ by control technology, which returns the robot 1 from its present position $x_0$ in the blocked area S to the boundary s of this area.

Additionally, in step S40 the timer t is incremented, subsequently the control and/or the method return to step S30. This way, the control 2 predetermines by control technology the first return force $T_1$ until the present position $x_0$ is no longer located in the blocked area S (S30: "N"), and then continues with step S50.

In step S50 the timer t is incremented and in the following step S60 it is checked if the present position $x_0$ of the robot 1 is (now) in the blocked area S. This way, indicated in the exemplary embodiment by the incrementation S50, it is determined in step S50 if the robot 1 assumes a present position $x_0$ in the blocked area S only after activation of the boundary monitoring.

If the control 2 determines in step S60 that the robot 1, only after activation of the boundary monitoring (cf. S50), assumes a present position $x_0$ in the blocked area S (S60: "Y"), it continues with step S70, otherwise i.e. when the present position $x_0$ is not located in the blocked area S (S60: "N"), it continues with step S80.

In step S70 the control 2 stipulates the second return force $T_2$ by way of control technology, which also returns the robot 1 from its present position $x_0$ in the blocked area S to the boundary s of this area.

In step S80 the robot 1 is, however, flexibly controlled as described for example in US 2004/0128026 A1, in which a (multi-dimensional) driving force $T_3$ is commanded depending on a manually applied external force for the manual guidance of the robot and a (positive) distance from the boundary s.

Subsequently to step S70 and S80, in step S90 it is respectively checked if the boundary monitoring is still activated and in this case (S90: "Y") it is continued with step S50, otherwise, i.e. in case of deactivation of the boundary monitoring (S90: "N"), with step S10.

FIG. 2 illustrates an impedance and/or admittance control of the compliant-controlled robot 1 in the blocked area x>s. Here, the robot 1 and/or its present position $x_0$ by a virtual spring using control technology to an anchor position $x_s$ on the boundary s and by a virtual damper using control technology is tied inertially and/or to the environment.

If the robot upon activation of the boundary monitoring is already located in the present position $x_0$ in the blocked area x>s (S30: "Y") here a first stiffness $c_1$ of the spring is predetermined.

If the robot, however, assumes only after activation of the boundary monitoring (cf. S50: t+Δt) the same position $x_0$ in the blocked area x>s (S60: "Y"), a second stiffness $c_2$ of the spring is predetermined.

The first stiffness $c_1$ is initially equivalent to zero in the exemplary embodiment and then increases depending on a time lag t from the activation t=0 of the boundary monitoring (cf. S20) until it reaches the value of the second stiffness $c_2$.

This way, the first stiffness $c_1$ upon activation of the boundary monitoring and thereafter is initially smaller than the second stiffness $c_2$. In a deviation, the first stiffness $c_1$ may also be permanently smaller than the second stiffness $c_2$.

Accordingly, in the same present position $x_0$ in the blocked area the first return force $T_1=c_1 \cdot (x_0-s)$, which is applied by the virtual spring using control technology, is at least temporarily smaller than the second return force $T_2=c_2 \cdot (x_0-s)$, at least initially equivalent to zero.

This way, advantageously a surprisingly massive return motion of the robot 1 is prevented due to an activation of the boundary monitoring in a present position in the blocked area.

The stiffness $c_1$ of the virtual spring, which ties the robot by control technology to the anchor position $x_s$ on the boundary s, is predetermined greater in case of a motion away from the boundary s than a motion towards said boundary or parallel thereto: $c_1(d(x_0-s)/dt>0) > c_1(d(x_0-s)/dt<0)$. In other words, a manual motion of the robot farther into the blocked area $(d(x_0-s)/dt>0)$ is opposed by a stronger resistance. In particular, the stiffness $c_1$ for the movement towards the boundary or parallel thereto can initially be equivalent to zero, so that (initially) no automatic return motion is introduced, while the stiffness $c_1$ for a motion away from the boundary may initially be greater than zero, so that it is faced right from the start with a resistance by control technology.

FIG. 3 illustrates an impedance and/or admittance control of the compliant-controlled robot 1 in the blocked area x>s according to another embodiment of the present invention. Here, the robot 1 and/or its present position $x_0$ are tied by a virtual spring using control technology to an anchor position $x_s$, by which the present position $x_0$ can be displaced towards the boundary s. Additionally, as explained with reference to FIG. 2, the robot may also be tied, by a virtual damper using control technology, inertially and/or to the environment, which is not shown in FIG. 3 for better clarity.

As an anchor position $x_s$, respectively a position is provided within the shortest connection between the present position $x_0$ and the boundary s, which is distanced by a predetermined distance δ from the present position $x_0$ from the boundary s. Hereby it is confirmed that an essentially constant return force is applied towards the boundary s. Similarly, the present position of the robot itself may be predetermined in order to prevent applying a return force towards the boundary, in particular at least at the onset upon activation of the boundary monitoring.

As symbolically indicated in FIG. 3 by a uni-directionally blocking link, the anchor position $x_s$ can be displaced by impinging an external force, in particular manual guidance, of the robot 1 not away from the boundary s (towards the right in FIG. 3). A virtual spring counteracts a respective motion of the robot, which spring stresses the tied anchor position $x_s$ and the present position $x_0$ distanced therefrom: $T=c \cdot (x_0-x_s)$.

The anchor position $x_s$ can, however, be displaced by a motion of the robot 1 and/or its present position $x_0$ towards the boundary (towards the left in FIG. 3), quasi with the present position $x_0$.

In other words, the anchor position $x_s$ is updated with and/or according to the present position $x_0$ if it is displaced towards the boundary s, and is not updated if it is displaced away from the boundary s.

This way, the return force T applied by the virtual spring via control technology, which returns the robot from its present position $x_0$ in the blocked area S towards the boundary s of this area, depending on the distance of the position $x_0$ from the anchor position $x_s$ that can be entrained, and thus on a distance of the position $x_0$ from the boundary s itself, is predetermined either independently, if the robot moves towards the boundary or parallel in reference to the boundary, in particular equivalent to zero if the actual position itself is predetermined as the anchor position.

On the other side, by retaining the anchor position $x_s$ another, greater retention force T is applied by the spring using control technology, if the robot is moved by the same distance away from the boundary.

Figure 1:
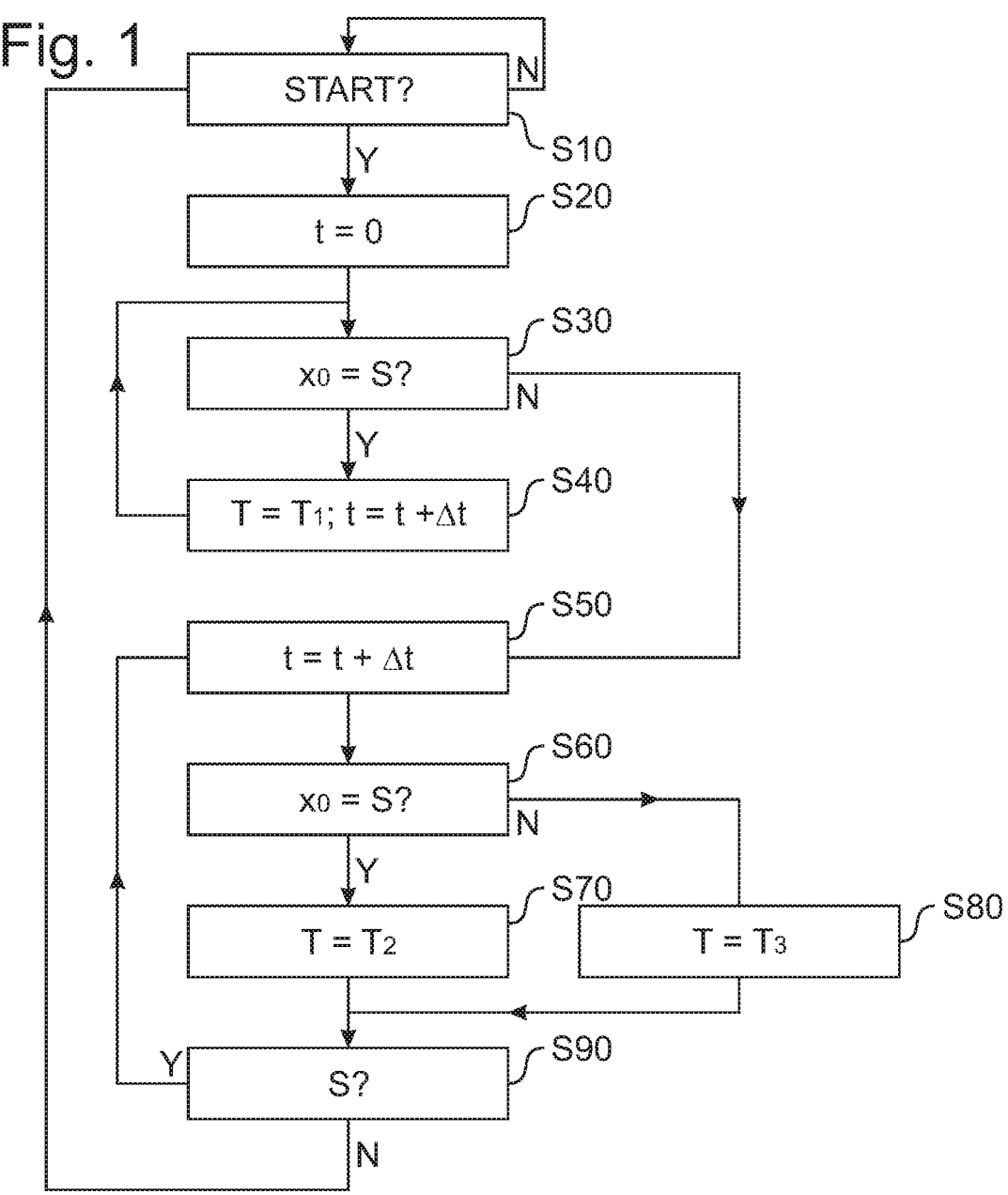
FIG. 1: shows a method for controlling a compliant-controlled robot according to one embodiment of the present invention.

This embodiment can be combined, in particular instead of the explanation given with reference to FIG. 2 with the embodiment explained with reference to FIG. 1, i.e. the return force can respectively represent the first (perhaps another first) return force $T_1$ (cf. S40), which is commanded and/or applied by control technology, if the robot is already, upon activation of the boundary monitoring, in the blocked area S (S30: "Y"). However, if the robot enters the blocked area S only after activation of the boundary monitoring, the second return force $T_2$ can be predetermined, in particular as stipulated in US 2004/0128026 A1 mentioned at the outset. Similarly, the predetermined and/or applied return force explained with reference to FIG. 3 may also be applied independently therefrom always at the boundary monitoring, i.e. even when the robot enters the blocked area only after the activation of the boundary monitoring (cf. S70).

This way, advantageously also a surprising massive return motion of the robot 1 is prevented, due to an activation of the boundary monitoring in a present position in the blocked area.

As explained above, in one embodiment additionally a damping force F can be applied by control technology, which counteracts a motion of the robot and depends on a present speed of the robot, as indicated in FIG. 2 by an inertially tied damper symbol and which similarly may also apply to the application of FIG. 3.

This damping force F may in a simple example be proportional to the present speed $dx_0/dt$ of the robot: $F = d \cdot dx_0/dt$.

In one embodiment, the proportionality and/or damping factor d is zero below a minimum speed, while it is greater than zero above the minimum speed, for example constant or varying with the distance from the boundary s. This way, in a second speed range above the predetermined minimum speed due to the proportionality and/or damping factor $d>0$ the damping force F is stronger with the present speed $dx_0/dt$ of the robot than in a first speed range below the minimum speed, in which the damping force F due to the proportionality and/or damping factor $d=0$ does not increase with the present speed.

This way it is possible to manually guide the robot below the minimum speed with weaker control technology, in particular undamped, while it is disproportionally stronger damped above the minimum speed. This way, not only a penetration into the blocked area is reduced, but additionally also a massive return motion can be prevented or at least reduced upon activation of the boundary monitoring.

Although exemplary implementations have been explained in the above description, it is hereby noted that a plurality of modifications is possible. In addition, it is hereby noted that the exemplary implementations are merely examples which are not intended to in any way restrict the scope of protection, the uses, and the construction. Rather, the preceding description gives a person skilled in the art a guideline for the implementation of at least one exemplary implementation, wherein various modifications, in particular with respect to the function and arrangement of the components described, can be undertaken without departing from the scope of protection as indicated by the claims and the equivalent combinations of features.

Even though exemplary embodiments are explained in the description above, it should be pointed out that a plurality of modifications are possible. Moreover, it should be pointed out that the exemplary embodiments are merely examples that do not restrict the scope of protection, the applications and configuration in any way. Instead, the description above gives the person skilled in the art a guideline for implementing at least one exemplary embodiment. At the same time it is possible to make diverse modifications, in particular, with respect to the function and the arrangement of the components described without departing from the scope of protection that will become apparent from the claims and the combination of features equivalent thereto.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE NUMBERS

1 Robot
2 Control
$x_{(O)}$ (present) Position
$x_S$ Anchor position
$c_{1;\ 2}$ (virtual) Spring stiffness
d Damping (factor)
s Boundary
S Blocked area x>s
$T_{(1,\ 2,\ 3)}$ (Return) force
F Damping force
t Time
δ Distance

What is claimed is:

1. A method for controlling a robot, the method comprising:
    determining with a robot controller whether or not a boundary monitoring of the robot has been activated;
    controlling by the robot controller movement of at least one axis of the robot with a first return force if the robot, upon activation of the boundary monitoring, is already in a blocked area, wherein the first return force operates to return the robot from a current position in the blocked area toward a boundary of the blocked area and the first return force is predetermined independent of a distance of the current position from the boundary; and
    controlling by the robot controller movement of at least one axis of the robot with a second return force if the robot arrived at the current position in the blocked area after activation of the boundary monitoring, wherein the second return force operates to return the robot from the current position toward the boundary and the second return force is predetermined;
    wherein the first return force is at least temporarily less than the second return force.

2. The method of claim 1, wherein the first return force is at least temporarily zero.

3. The method according to claim 1, further comprising:
    predetermining a stiffness of a virtual spring that ties the robot to an anchor position;
    wherein a first stiffness is predetermined if the robot, upon activation of the boundary monitoring, is already in a position in the blocked area;
    wherein a second stiffness is predetermined if the robot arrived at the current position in the blocked area after activation of the boundary monitoring; and
    wherein the first stiffness is less than the second stiffness, at least upon activation of the boundary monitoring.

4. The method of claim 3, wherein the virtual spring ties the robot to an anchor position on the boundary.

5. The method of claim 1, further comprising:
    predetermining a stiffness of a virtual spring that ties the robot to an anchor position;

wherein the stiffness is predetermined based on a time lag from the activation of the boundary monitoring.

6. The method of claim 5, wherein the virtual spring ties the robot to an anchor position on the boundary.

7. The method of claim 5, wherein the stiffness is predetermined based on a time lag if the robot is already in the blocked area upon activation of the boundary monitoring.

8. The method of claim 5, wherein the stiffness is predetermined based on a time lag only if the robot is already in the blocked area upon activation of the boundary monitoring.

9. The method of claim 1, further comprising:
predetermining a stiffness of a virtual spring that ties the robot to an anchor position;
wherein the stiffness is predetermined based on a motion of the robot relative to the boundary.

10. The method of claim 9, wherein the predetermined stiffness is greater when the motion is in a direction away from the boundary than when the motion is in a direction that is not away from the boundary.

11. The method of claim 10, wherein the predetermined stiffness is greater in a direction away from the boundary when the robot is already in the blocked area upon activation of the boundary monitoring.

12. The method of claim 10, wherein the predetermined stiffness is greater in a direction away from the boundary only when the robot is already in the blocked area upon activation of the boundary monitoring.

13. A method for controlling a robot, the method comprising:
performing by a robot controller a boundary monitoring of the robot;
controlling by the robot controller movement of at least one axis of the robot with a first return force, wherein the first return force operates to return the robot from a current position in a blocked area to a boundary of the blocked area and the first return force is predetermined independent of a distance of the current position from the boundary, if the robot is moved a specified distance toward the boundary or parallel to the boundary; and
controlling by the robot controller movement of at least one axis of the robot with a second return force, which is greater than the first return force, the second return force being predetermined, if the robot is moved by the specified distance away from the boundary.

14. The method of claim 13, wherein the first return force is equivalent to zero.

15. The method of claim 13, wherein the robot is moved with the second return force if the current position of the robot is already in the blocked area when the boundary monitoring begins.

16. The method of claim 13, wherein the robot is moved with the second return force only if the current position of the robot is already in the blocked area upon activation of the boundary monitoring.

17. The method of claim 13, further comprising:
controlling movement of at least one axis of the robot with a third return force if the robot, upon activation of the boundary monitoring, is already in a blocked area, wherein the third return force operates to return the robot from a current position in the blocked area toward a boundary of the blocked area and is predetermined; and
controlling movement of at least one axis of the robot with a fourth return force if the robot arrived at the current position in the blocked area after activation of the boundary monitoring, wherein the fourth return force operates to return the robot from the current position toward the boundary and is predetermined;
wherein the third return force is at least temporarily less than the fourth return force.

18. The method of claim 13, wherein an anchor position of a virtual spring to which the robot is tied cannot be displaced away from the boundary by an external impingement of force.

19. The method of claim 18, wherein the external impingement force is an external manual guidance force applied to the robot.

20. The method of claim 13, further comprising:
setting an anchor position of a virtual spring to which the robot is tied as a current position of the robot or as a position within a connection between the current position and the boundary that is spaced apart from the current position toward the boundary by a distance.

21. The method of claim 20, wherein the connection is the shortest connection between the current position and the boundary.

22. The method of claim 1, further comprising:
controlling the robot with a damping force counteracting a motion of the robot, the damping force based on a current speed of the robot;
wherein the damping force increases more strongly in a second speed range above a predetermined minimum speed than in a first speed range below the minimum speed.

23. A controller for controlling a robot, the controller having program code stored on a non-transitory computer-readable storage medium and that, when executed by the controller, causes the controller to:
determine whether or not a boundary monitoring of the robot has been activated;
control movement of at least one axis of the robot with a first return force if the robot, upon activation of the boundary monitoring, is already in a blocked area, wherein the first return force operates to return the robot from a current position in the blocked area to a boundary of the blocked area and is predetermined independent of a distance of the current position from the boundary; and
control movement of at least one axis of the robot with a second return force if the robot arrived at the current position in the blocked area after activation of the boundary monitoring, wherein the second return force operates to return the robot from the current position toward the boundary and is predetermined;
wherein the first return force is at least temporarily less than the second return force.

24. A robot arrangement comprising:
a multi-axis robot; and
the controller of claim 23 communicating with the robot and controlling operation the robot.

25. A computer programming product having program code stored on a non-transitory computer-readable storage medium, the program code, when executed by a controller associated with a multi-axis robot, causing the controller to:
determine whether or not a boundary monitoring of the robot has been activated;
control movement of at least one axis of the robot with a first return force if the robot, upon activation of the boundary monitoring, is already in a blocked area, wherein the first return force operates to return the robot from a current position in the blocked area to a boundary of the blocked area and is predetermined independent of a distance of the current position from the boundary; and control movement of at least one axis of the robot with a second return force if the robot arrived at the current position in the blocked area after activation of the boundary monitoring, wherein the second return force operates to return the robot from the current position toward the boundary and is predetermined;

wherein the first return force is at least temporarily less than the second return force.

* * * * *